Aug. 6, 1935.  W. J. TAYLOR ET AL  2,010,043
PUNCH PRESS ASSEMBLY
Filed Oct. 27, 1932   8 Sheets-Sheet 1
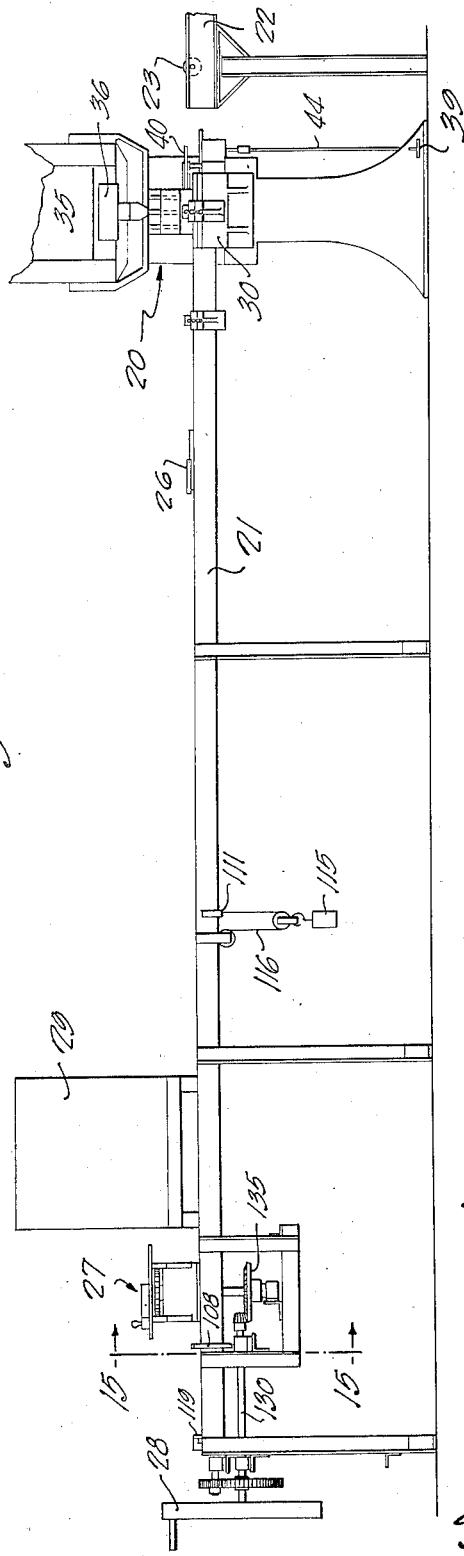
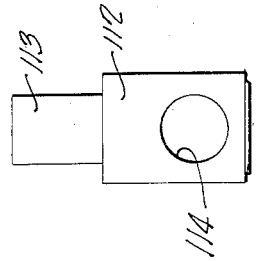
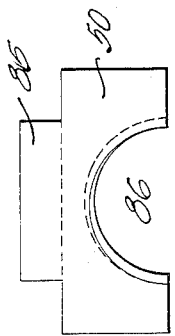
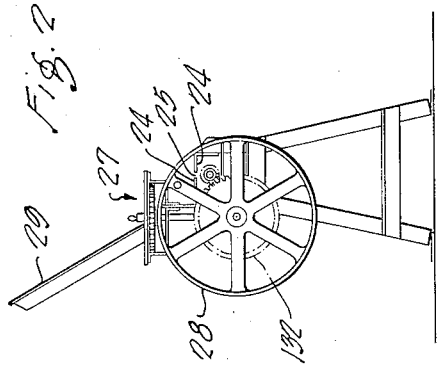
Inventors
William J. Taylor
Joseph A. Boudreau
Frank L. Irish
by Roberts, Cushman & Woodbury
Attys

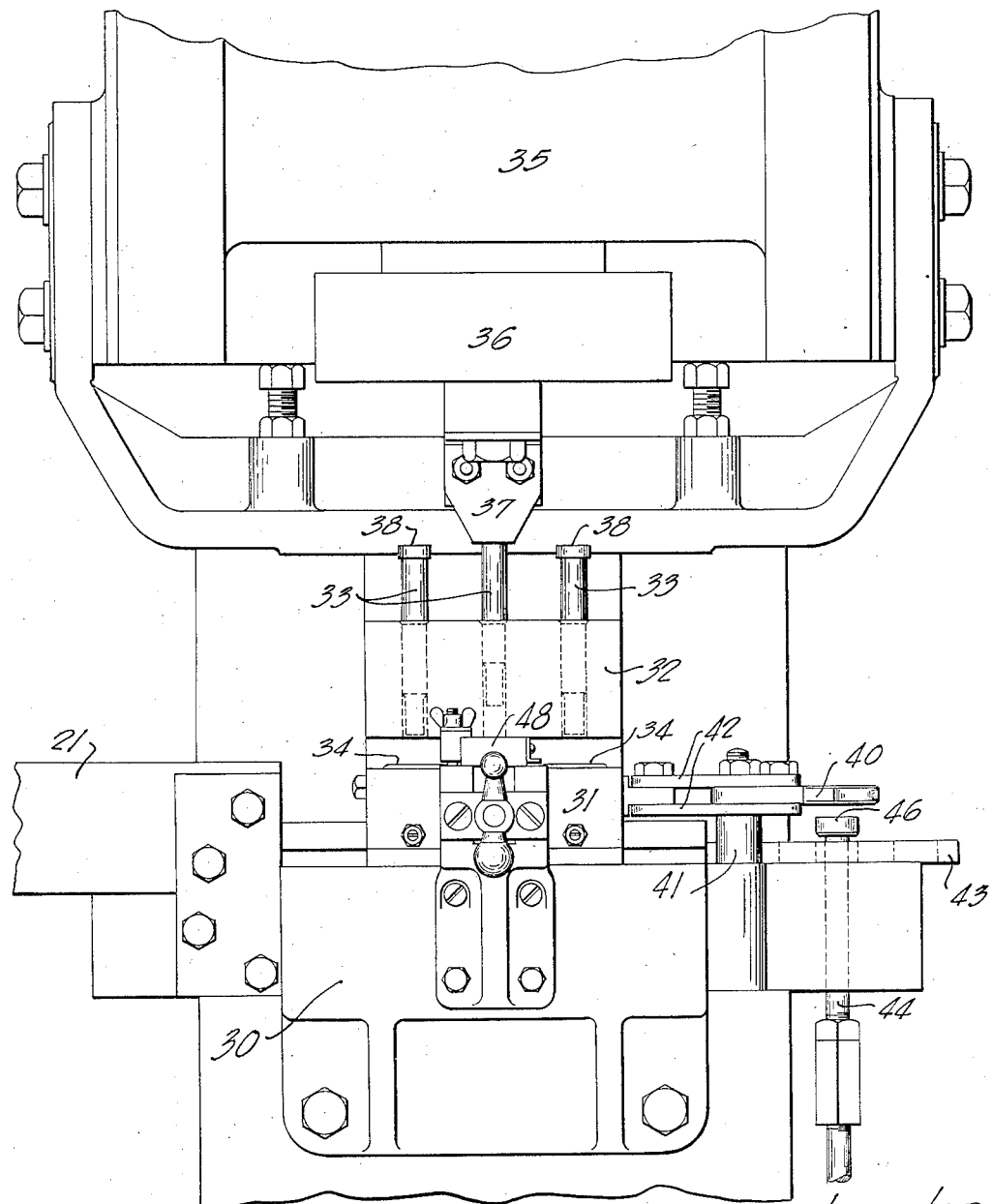

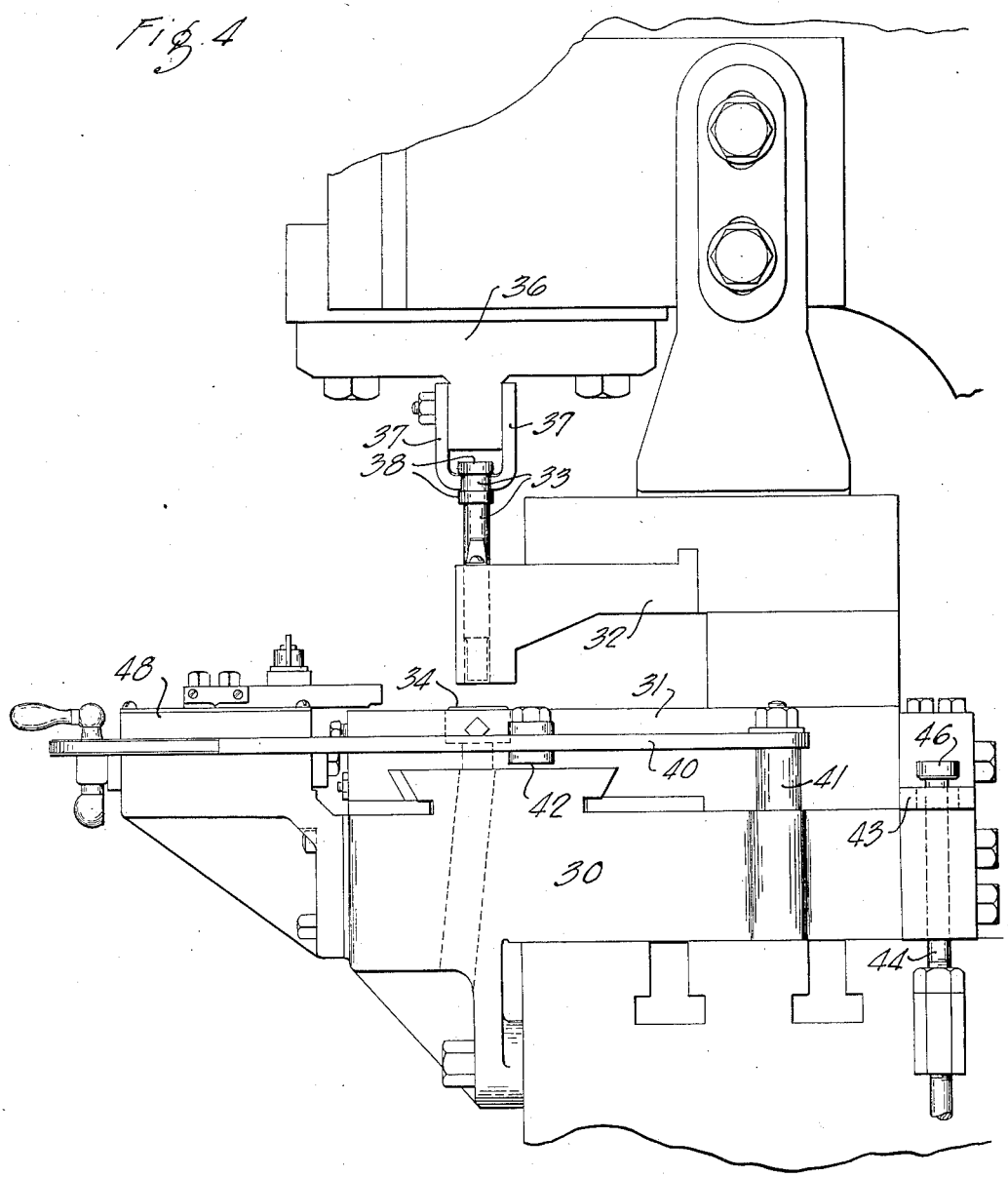

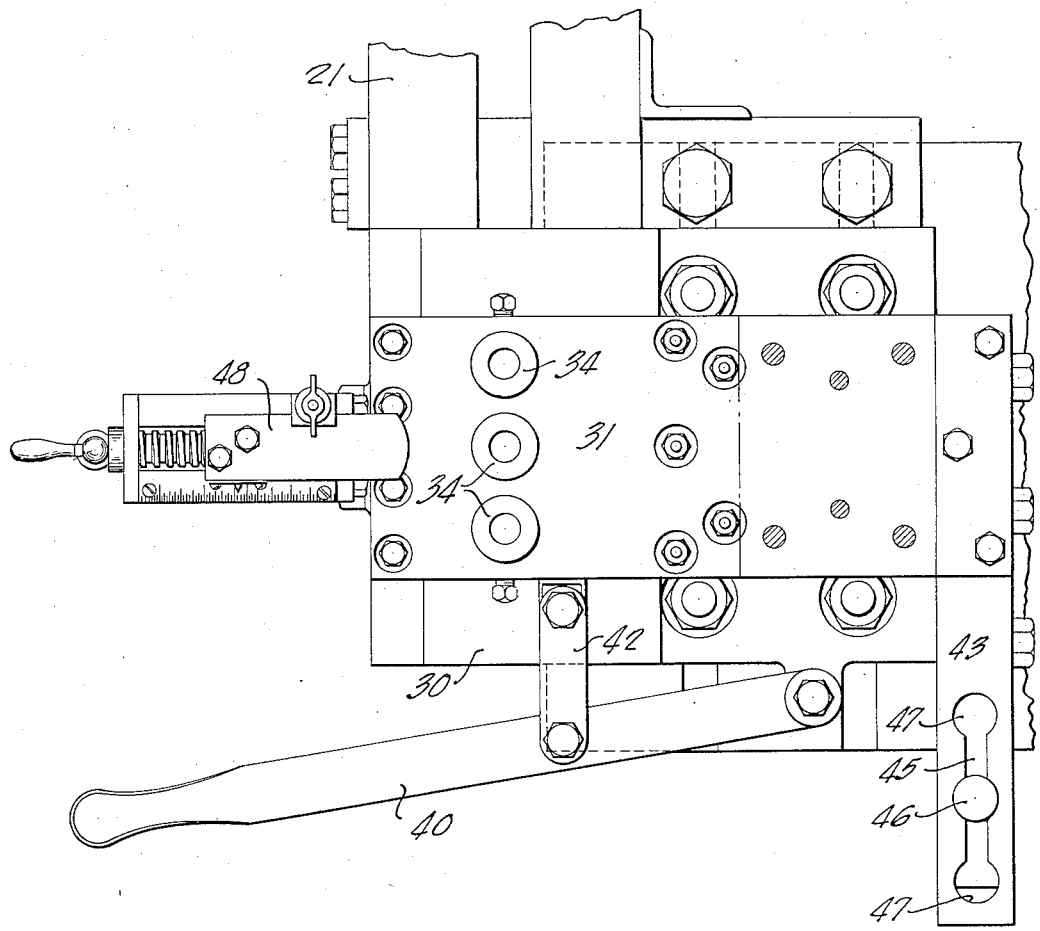

Aug. 6, 1935.  W. J. TAYLOR ET AL  2,010,043
PUNCH PRESS ASSEMBLY
Filed Oct. 27, 1932   8 Sheets-Sheet 5
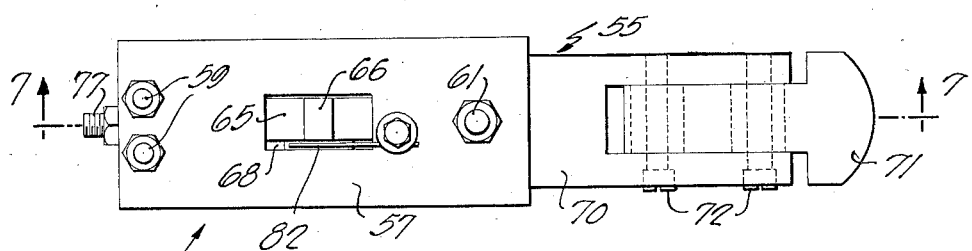
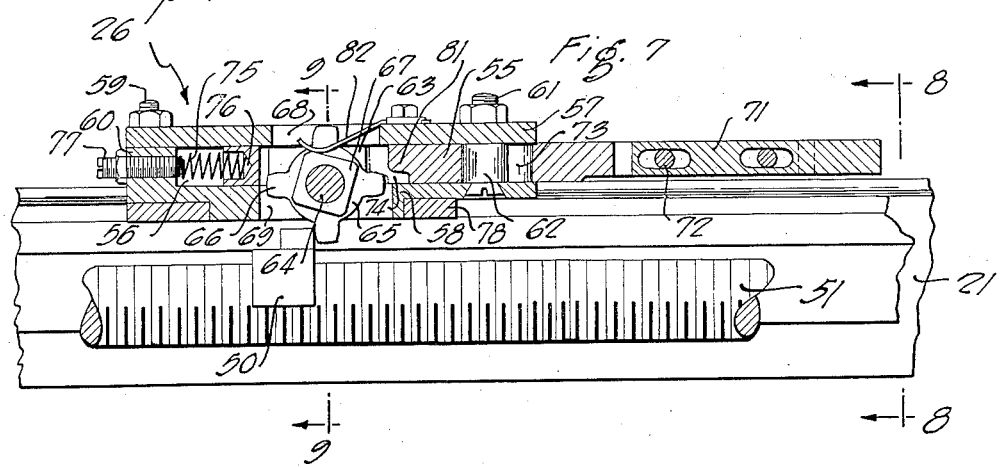
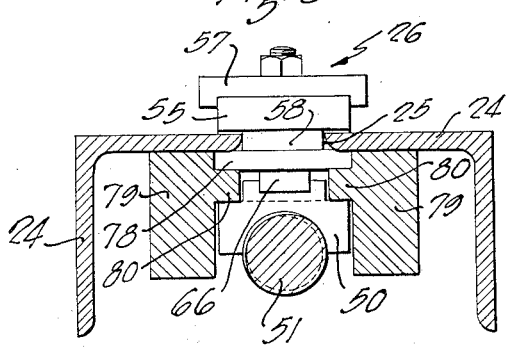
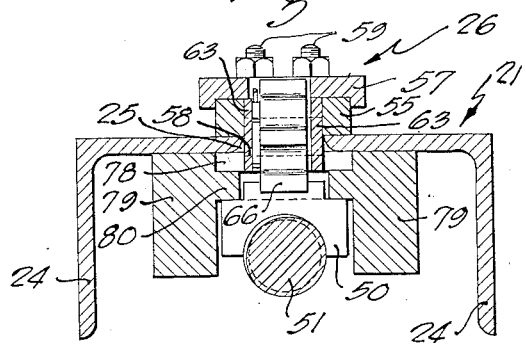
Inventors
William J. Taylor
Joseph A. Boudreau
Frank L. Irish

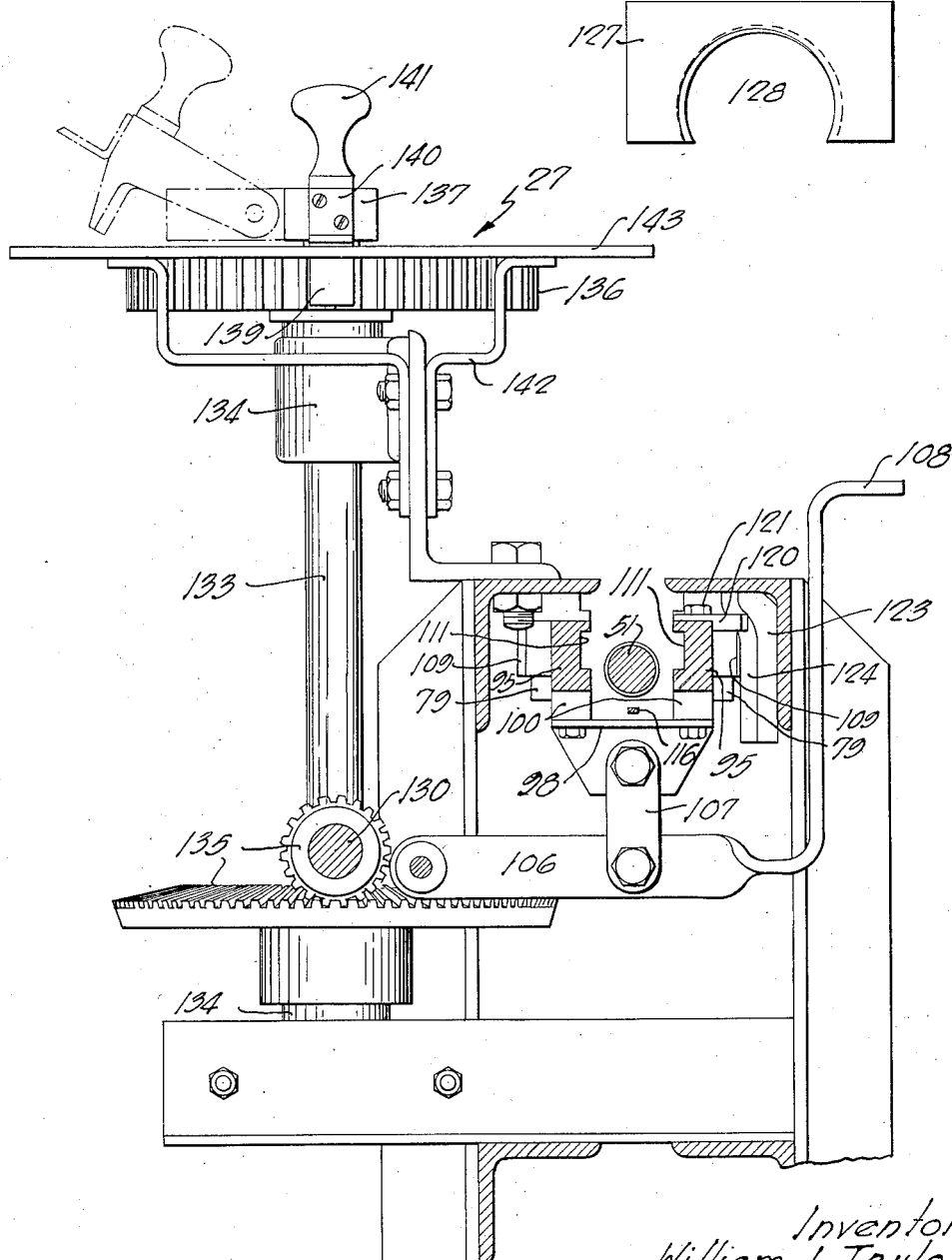

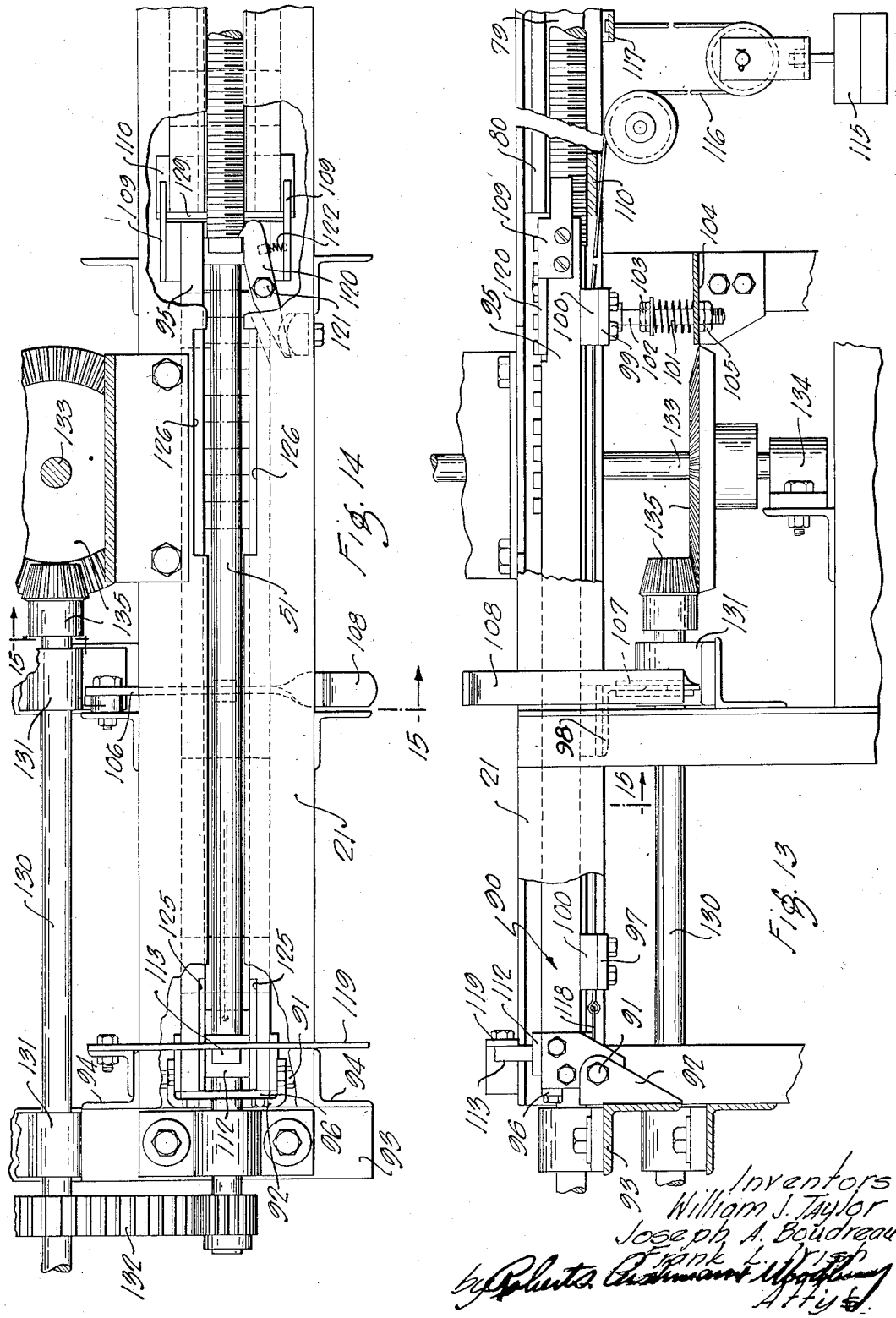

Aug. 6, 1935.  W. J. TAYLOR ET AL  2,010,043
PUNCH PRESS ASSEMBLY
Filed Oct. 27, 1932  8 Sheets-Sheet 8

Inventors
William J. Taylor
Joseph A. Boudreau
Frank L. Irish
Attys

Patented Aug. 6, 1935

2,010,043

UNITED STATES PATENT OFFICE 2,010,043

PUNCH PRESS ASSEMBLY

William J. Taylor, Joseph A. Boudreau, and Frank L. Irish, Syracuse, N. Y., assignors to The Lamson Company, Syracuse, N. Y., a corporation of Massachusetts Application October 27, 1932, Serial No. 639,768

20 Claims. (Cl. 164—87)

This invention relates to an improvement in a punch press assembly and more particularly to the means for feeding the work to the punch and in the structure of certain features of the punch itself.

Heretofore it has been the usual practice in feeding work to a punch press either to scribe on the work the locations of the holes to be punched or to move the work a measured distance after each hole is punched, such distances varying and necessitating repeated measurings, and thus delaying the operation of the machine. One object of the present invention is to provide means for automatically feeding the work to the press which avoid the procedure outlined above and by which the distances between the holes to be punched are definitely fixed without the requirement of any scribing or actual measuring of the work.

In the illustrated embodiment the distance between the holes to be punched is determined by a plurality of stop blocks which successively trip a pilot engaged by the forward end of the work and pushed thereby away from the press. These stop blocks are positioned by the operator prior to the beginning of the punching operation at various points along the path of travel of the pilot in accordance with the prescribed distances between the holes to be punched in the work as shown, for example, on a guide print or instruction sheet.

A further object of this invention resides in the provision of means, in a press having a plurality of punches of different diameters, for selecting the punch to be used and for preventing the operation of the press except when a punch is in the proper position to act.

Other objects of the invention will appear from a consideration of the following description of the selected embodiment of the invention and of the drawings which illustrate such embodiment and in which;

Fig. 1 is a front elevation of a punch press assembly which embodies one form of this invention;

Fig. 2 is an end elevation thereof taken from the left in Fig. 1;

Figs. 3 and 4 are enlarged front and side elevations respectively of a portion of the punch press;

Fig. 5 is a plan view of the die holder of the punch press;

Fig. 6 is a plan view of the pilot which is advanced over the work table by the forward end of the work;

Fig. 7 is a sectional view, taken along the line 7—7 on Fig. 6, of the pilot, shown in inoperative relation to a spacing block in the work table;

Fig. 8 is a sectional view of the work table and end elevation of the pilot taken along the line 8—8 on Fig. 7;

Fig. 9 is a sectional view taken along the line 9—9 on Fig. 7;

Figs. 10, 11 and 12 illustrate in elevation a spacing block, a pusher block and a lead block respectively;

Fig. 13 is a front elevation and Fig. 14 a plan view of the magazine for the spacing and pusher blocks and a portion of the work table, parts of each being broken away;

Fig. 15 shows in elevation the magazine feed control mechanism and in section the work table and magazine taken along the line 15—15 on Fig. 14;

Figure 16:
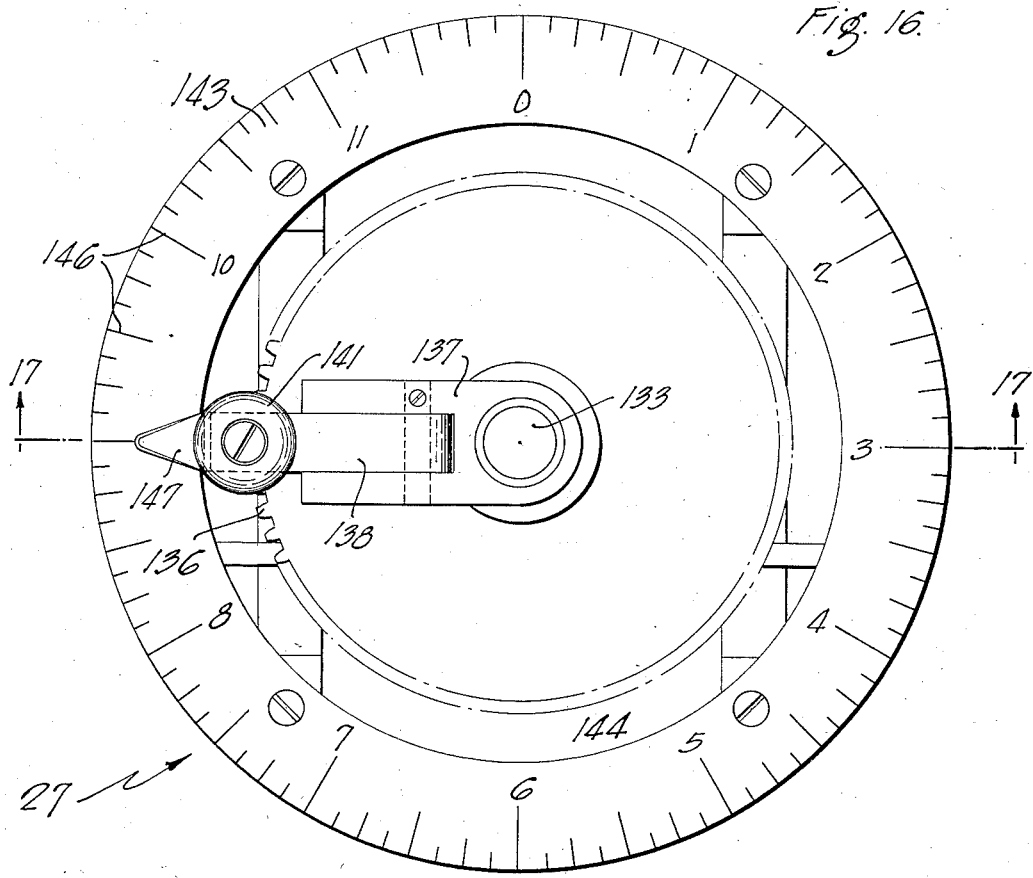
Fig. 16 is a plan view of the feed control mechanism.

The punch press assembly shown in Fig. 1 comprises a punch press 20, a work table 21 on which rests the work as it is fed from the press 20 and a table 22 from which the work is fed to the press. The table 22 may be of any desired form and, as shown in the selected embodiment, includes rollers 23 on which the work is supported and over which it is fed by hand. The work table 21 comprises angle bars 24 spaced apart to form a continuous slot 25 in which, as will be pointed out later, travels a pilot 26 which is engaged and advanced over the table by the forward end of the work. The movement of the pilot 26 is regulated by a plurality of spacing blocks so that its travel is stopped and the work is held stationary for the punching operation at points, predetermined distances apart. The location of the spacing blocks is determined by a control mechanism at the left end of the work table in Fig. 1 and comprising an index 27 and a manually rotatable wheel 28. The location of the spacing blocks may be set forth on a chart, and, for convenience in supporting the chart, an inclined easel 29 is provided.

The punch press (Figs. 3, 4 and 5) comprises a bolster 30 rigidly fixed in place, a die holder 31 supported by and laterally movable over the bolster, and a punch holder 32 attached to and movable with the die holder 31. Mounted for reciprocation in the punch holder 32 are a plurality of punches 33 which coact with corresponding dies 34 in the die holder 31. In the present embodiment are provided three punches and dies which vary in diameter. Carried by the face of the ram 35 is a punch pad 36 which is adapted to act upon a selected punch. Stripper plates 37 carried by the pad engage below the head 38 of that punch to remove it from the work in the usual manner. The ram 35 is reciprocated in any suitable manner by mechanism under the control of the operator through the pedal 39.

The die and punch holders are shifted as a unit laterally of the bolster 30 to bring the selected punch below the punch pad 36 by means of a lever 40 pivoted at its inner end to a post 41 on the bolster and connected by links 42 to the die holder. Means are provided in order to prevent operation of the ram 35 except when the die and punch holders are in one of the positions in which a punch is below the punch pad 36, which means comprise a slotted bar 43 secured to the die holder 31 and a rod 44 attached to the pedal 39 and passing through the slot 45 in the bar 43. The rod 44 terminates in a head 46 and the slot 45 is enlarged at each end and at the middle to form an opening 47 of a size to receive the head 46. If the die and punch holders are properly located, the depression of the pedal 39 to start the press will draw the head 46 into a selected opening 47. Should, however, the pedal 39 be depressed when the holders are not properly located, the head 46 will engage the walls of the slot 45 and stop the movement of the pedal before it has set the press in operation. A suitable gauge 48 of any well known type determines the position of the work transversely of the press.

As pointed out above the work is fed to the press from the feed table 22 and after the forward end of the work has passed the press it engages the pilot 26 and moves it along the work table 21 away from the press. In order to determine the various points on the work at which holes are to be punched, a plurality of spacing blocks 50 are located along the threaded portion of a shaft 51 which extends below the slot 25 in the table 24. When the pilot 26 is moved into contact with a spacing block the advance of the work is stopped and the operator then sets the press in operation to punch a hole in the work.

The pilot 26 (Figs. 6, 7, 8 and 9) comprises a plate 55, one end of which reciprocates in a pocket 56 formed by and between plates 57 and 58. The plates 57 and 58 are joined at one end by bolts 59 which enter a wall 60 of the plate 58 and by a bolt 61 which passes through a spacing sleeve 62. Posts 63 at opposite sides of the plate 58 coact with the wall 60 and sleeve 62 to determine the height of the pocket 56 formed by the plates 57 and 58. Supported on a stud shaft 64 carried by the posts 63 is a wheel 65 having four projecting teeth 66 arranged 90 degrees apart and a rectangular boss 67 offset relative to the teeth, as shown in Fig. 7. Formed in the plates 57 and 58 are slots 68 and 69 respectively which permit the rotation of the wheel 65.

The plate 55 consists of a main portion 70 and a tongue 71 attached thereto by bolts 72. In the portion 70 are formed two slots 73 and 74 the former receiving the sleeve 62 and the latter receiving the posts 63 and the wheel 65. The plate 55 normally takes the position shown in full lines in Fig. 7 against the sleeve 62 under the urge of a spring 75. One end of the spring enters a pocket 76 in the end of the plate 55 while the other end bears against a set screw 77 mounted in the wall 60 and adjustable to control the tension of the spring 75. As shown in Fig. 8 the plate 58 enters the slot 25 and is secured therein by a key plate 78. Rigidly fixed to the under sides of the bars 24 at opposite sides of the slots are guide rails 79 (see Fig. 8) having parallel projecting tongues 80. The side edges of the key plate 78 enter the spaces between the bars 24 and the tongues 80, and the pilot 26 is thus held at all times in the slot 25. The rails 79 extend downwardly at opposite sides of the shaft 51 and act to position the spacing blocks 50 supported thereby as will be pointed out below.

The forward end of the work bears against the tongue 71 and advances the plate 55 against the urge of the spring 75 until the shoulder 81 of the plate passes over one of the teeth 66, as shown in dotted lines in Fig. 7, and prevents its rotation. Obviously when the tooth 66 projecting below the pilot 26 engages a spacing block 50, further advance of the pilot and work is stopped indicating to the operator that the work is in position for another punching operation. The work after the hole has been punched by the press is retracted to allow the plate 55 to take the full line position shown in Fig. 7, releasing the wheel, and the wheel is rotated by a spring 82, carried by the plate 57 and projecting through the slot 68 therein into contact with one face of the boss 67. The rotation of the wheel releases the pilot from engagement with the block 50 and the spring limits this rotation to a quarter turn, so that when the work is again brought against the tongue 71 the wheel will again be locked by the plate 55 with one tooth extending downwardly.

The spacing blocks 50, shown in Fig. 10, are substantially rectangular in form, having an upwardly projecting tongue 85 which is engaged by the teeth of the wheel 65. In the base of the block is formed a semi-cylindrical pocket 86, the curved wall of which is threaded so that when the block rests on the threaded portion of the shaft 51 the wall and shaft are in mesh. These blocks are normally stored in and supplied from a magazine 90 pivotally mounted between the angle bars 24 at the outer end of the work table.

The magazine is supported upon pins 91 carried by an angle plate 92 fixed to a crossbar 93 (see Figs. 13 and 14) to which through brackets 94 is also secured one end of the work table 21. The magazine 90 comprises two guide bars 95 between which the unthreaded portion of the shaft 51 extends. The bars 95 are connected by a strap 96 at one end and by straps 97, 98 and 99 which extend below the shaft and are spaced therefrom by blocks 100. As shown in Figs. 13 and 14, the bars 95 terminate at the ends of the fixed guide rails 79. The magazine is normally held in the upper position by an expansion spring 101 which surrounds a pin 102 projecting downwardly from the strap 99. One end of the spring bears against the nuts 103 on the pin 102 and the other end bears against a fixed bracket 104 through which the pin 102 passes. Nuts 105 on the lower end of the pin adjustably determine the limit of the upward movement of the magazine. The magazine is depressed by means of a lever 106 connected through a link 107 to the strap 99 and terminating in a handle 108 which projects above the upper surface of the work table 21 (see Fig. 15). The downward movement of the magazine is limited by brackets 109 secured to the end thereof which contact with a plate 110 fixed to the ends of the guide rails 79 (see Figs. 13 and 14).

The bars 95 (Fig. 15) are provided with opposed channels 111 which receive the ends of the spacing blocks 50 and hold them above the shaft 51 a sufficient distance so that the pockets 86 are out of engagement therewith when the magazine is in its upper position. Supported at all times on the channels 111 is a pusher block 112 (see Fig. 11) having an upwardly projecting tongue 113 and a cylindrical passage 114 through which the unthreaded portion of the shaft 51 passes freely. The pusher block 112 is yieldably held in contact with the spacing blocks by any suitable means, as for example by the counterweight 115 which acts on a band chain 116 secured at one end to a loop 117 fixed to the table 21 and at the other end to a strap 118 attached to the bottom of the block 112. In order to hold the block at the outer or left-hand end of the magazine 90 there is provided a pivotally mounted gate 119 which extends across the slot 25 and engages the tongue 113 to prevent the travel of the block under the urge of the counterweight 115. When the gate 119 is raised the block 112 engages the spacing blocks 50 in the magazine and yieldingly advances them toward the right-hand end of the magazine where the travel of the blocks is stopped by the contact of the leading block 50 with the guide rails 79.

When the magazine is lowered a latch 120 pivoted on one of the bars 95 by a pin 121 is yieldably held in the operative position shown in Fig. 14 by an expansion spring 122, the ends of which bear upon the head of the latch and the bracket 109. The position of the latch 120 is determined by a post 123 (see Fig. 15) having a curved face 124 on which the tail of the latch bears. When the magazine is lowered the latch is closed by the spring 122 to engage the second spacing block and prevent its further travel along the magazine until the latter is raised and the latch thereupon is opened by the post 123 to release the blocks and allow them to advance until the first block contacts with the ends of the rails 79.

The portions of guide bars 95 above the channels 111 are cut away at the left-hand end (see Fig. 14) to provide an opening 125 which permits movement of the spacing blocks 50 between the magazine and the space over the magazine and below the top of the table. Thus the blocks can be inserted in or removed from the magazine. The edges of the angle bars 24 are also cut away at 126 so that blocks to be inserted in the magazine may be dropped onto the guide bars 95 and then moved along the left-hand end. Similarly blocks removed from the magazine may be moved along the bars 95 and taken out from below the table at 125.

In addition to the pusher and spacing blocks there is also provided a single lead block 127 (see Fig. 12) having a pocket 128 with a threaded wall in engagement with the threaded portion of the shaft 51. It will be noted that the walls extend below the center of the shaft so that, unlike the spacing blocks 50, this block is at all times in engagement with the shaft. This block has no upwardly projecting tongue and the wheel 65 of the pilot 26 passes freely over it. The block 127 is stopped at the end of the rails 79 by the flange 129 on the plate 110, such flange being so low that the spacing blocks 50 pass freely over it.

Figure 17:
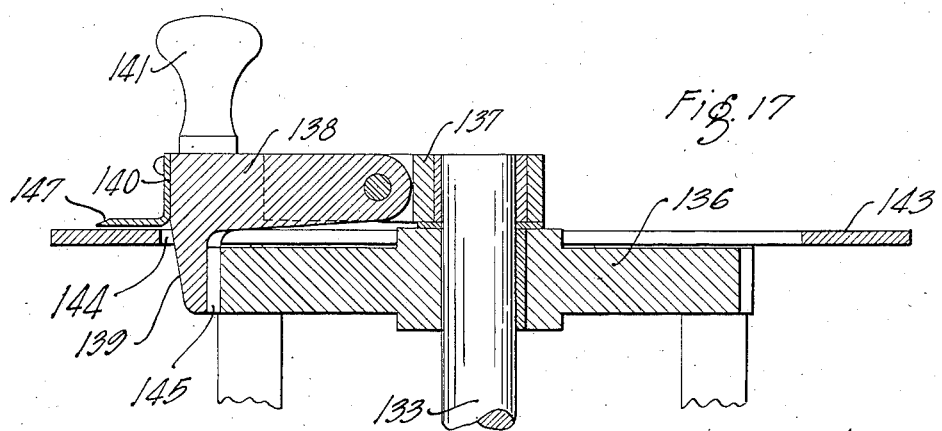
Fig. 17 is a sectional view thereof taken along the line 17—17 on Fig. 16.

The distances between the spacing blocks 50 along the threaded portion of the shaft 51 is determined by the feed control mechanism shown in detail in Figs. 14, 15, 16 and 17. A shaft 130 suitably supported in bearings 131 parallel to the shaft 51 is connected to that shaft by gearing 132 so that both shafts are rotated simultaneously. A vertical shaft 133 supported in bearings 134 is driven by the shaft 130 through gearing 135 and extends upwardly through a gear 136 which is keyed for rotation with the shaft. An arm 137 surrounds the upper end of the shaft and is rotatable relative thereto. Pivoted to the arm 137 is a finger 138 provided with a tongue 139, an index bracket 140 and a knob or handle 141 by which the finger is raised or lowered. Supported on standards 142 is a fixed ring 143 which surrounds and is spaced from the gear 136, leaving a continuous space 144 through which the tongue 139 of the finger 138 may project as shown in Fig. 17. The tongue 139 is provided with a tooth 145 which, when the finger is lowered, meshes between two teeth of the gear 136 so that the finger and arm are rotated with the shaft 133.

The upper face of the ring 143 is divided by lines or marks 146 into a plurality of equal spaces and the index bracket terminates into a pointer 147 which may be brought into alignment with any of the lines or marks 146. Each line 146 preferably is on a radius which passes midway between two teeth on the gear 136. The longest lines are, as shown in Fig. 16, designated by numerals and in the present embodiment designates the inches a block 50 is advanced by the shaft 51.

The spacing of the blocks 50 along the shaft 51 in accordance with the location of the holes to be punched in the work will now be described. Assume that the blocks 50 are all in the magazine 90, that the gate 119 is raised and the pusher block 112 is in contact with the nearest spacer block 50, that the lead block 127 bears against the flange 129 at the free end of the magazine and that the finger 138 is swung around the shaft 133 until it is over the line marked 0 and then lowered into engagement with the gear 136. An instruction sheet or chart has previously been prepared setting forth the distance from the forward end of the work to the first hole and also the distances between the holes. This chart may be placed on the easel 29. The shaft 51 is rotated by the wheel 28 to advance the lead block 127 until the pointer 147 on the finger 138, which is advanced by the rotation of the shaft, registers with the line designating the distance between the end of the work and the first hole to be punched therein. The rotation of the shaft is stopped, the finger 138 is returned into register with the line marked 0 and the magazine 90 is lowered by depressing the handle. The pocket 86 of the leading block 50 is thus brought into mesh with the shaft 51 and by rotating the shaft the block is advanced until the pointer 147 registers with the line indicating the distance between the first and second holes. It will be understood that when the magazine is lowered the latch 120 is advanced by the spring 122 to hold the other blocks in the magazine at rest so that only one block 50 is removed, and that when the magazine is released the latch 120 is retracted so that the pusher block 112 advances the blocks 50 one step.

These operations are repeated until the shaft 51 carries one spacer block for each hole to be punched in the work. The shaft is finally rotated without feeding any more blocks from the magazine until the lead block 127 arrives at the end of the work table and the spacing mechanism is then set ready for the punching operations.

The pilot 26 is moved along the table 21 to the press and the work is advanced from the feed table 22 over the die holder 31 of the press with its forward end in engagement with the pilot 26 on the work table 21 until the pilot is stopped by the first spacing block 50. The punch press is operated to make the first hole, then the pilot is manually released from the first block and advanced by the work until stopped by the second spacing block. These operations continue until all the required holes are punched. If the holes in the next piece of work are spaced as in the first piece, no change need be made in the set-up of the spacing blocks and the previous operation is repeated. If, however, the holes are differently spaced, the previous set-up must be changed. This is done by holding the magazine 90 in the lowered position and rotating the shaft 51 in the opposite direction until all the spacing blocks 50 are returned to the magazine. The pusher block 112 is preferably moved to the position shown in Fig. 14 and the gate 119 lowered in order to facilitate the filling of the magazine. The spacing blocks are then reset in the manner previously described. It will be understood, however, that if the spacing of the holes at the forward end of the work are unchanged it will only be necessary to reset those spacing blocks which determine the location of the changed hole and all subsequent holes.

While one embodiment of this invention has been shown and described in detail, we are not limited thereto since other embodiments might be made without departing from the spirit and scope of the invention as set forth in the following claims.

We claim:

1. The combination with a machine of a work table on which work is supported as it moves away from the machine, and means carried by said table for stopping the movement of the work on the table at predetermined points, said means including a pilot movable in a slot in the work table, and engaged by the forward end of the work and moved thereby in the slot, a shaft supported by said table below the slot therein, and members carried by the shaft which engage the pilot and prevent its movement by the work.

2. The combination with a machine of a work table on which the work is supported as it moves away from the machine, said table having a longitudinally extending slot in the top thereof, and means for stopping the movement of the work on the table at predetermined points, said means including members spaced longitudinally along the slot, and a pilot fixed to reciprocate in said slot, said pilot including a movable portion adapted to engage said members and be moved thereby, and a reciprocable plate yieldingly held out of engagement with said portion, the forward end of the work bearing against said plate to move it into engagement with said portion and thereafter to move the pilot along the slot, whereby said portion, as the pilot is moved along the slot by the work, engages a member and prevents movement of the pilot and work.

3. The combination with a machine of a work table on which the work is supported as it moves away from the machine, said table having a longitudinally extending slot in the top thereof, and means for stopping the movement of the work on the table at predetermined points, said means including members spaced longitudinally along the slot, and a pilot fixed to reciprocate in said slot, said pilot including a rotatable toothed wheel adapted to engage said members and be moved thereby, and a reciprocable plate yieldingly held out of engagement with said wheel, the forward end of the work bearing against said plate to move it into engagement with said wheel and hold it fixed with one tooth projecting into the plane of the spaced members and thereafter to move the pilot along the slot whereby the projecting tooth, as the pilot is moved along the slot by the work, engages a member and prevents movement of the pilot and work.

4. The combination with a machine of a work table on which the work is supported as it moves away from the machine, said table having a longitudinally extending slot in the top thereof, and means for stopping the movement of the work on the table at predetermined points, said means including a shaft extending below the slot in the table, means for rotating said shaft, a plurality of members spaced along said shaft, and a pilot fixed to reciprocate in said slot, and having a portion adapted to engage said members, said pilot being engaged by the forward end of the work and moved thereby along the slot until said portion engages a member whereby the movement of pilot and work is prevented.

5. The combination with a machine of a work table on which the work is supported as it moves away from the machine, said table having a longitudinally extending slot in the top thereof, and means for stopping the movement of the work on the table at predetermined points, said means including a shaft extending below the slot in the table, means for rotating said shaft, a plurality of members spaced along said shaft, and a pilot fixed to reciprocate in said slot, said pilot including a toothed wheel, and a reciprocable plate yieldingly held out of engagement with the wheel, the forward end of the work bearing against the plate and moving it into engagement with the wheel to hold it at rest with one tooth projecting downwardly, which tooth, as the pilot is moved by the work along the slot, engages a member whereby the movement of pilot and work is prevented.

6. The combination with a machine of a work table on which the work is supported as it moves away from the machine, said table having a longitudinally extending slot in the top thereof, and means for stopping the movement of the work on the table at predetermined points, said means including members spaced longitudinally along the slot, a pilot fixed to reciprocate in said slot and having a portion adapted to engage said members, said pilot being engaged by the work and moved thereby along the slot, the movement of the pilot being stopped when the pilot portion engages a member, and means for locating said members at predetermined distances apart along the slot.

7. The combination with a machine of a work table on which the work is supported as it moves away from the machine, said table having a longitudinally extending slot in the top thereof, and means for stopping the movement of the work on the table at predetermined points, said means including members spaced longitudinally along the slot, a pilot fixed to reciprocate in said slot and having a portion adapted to engage said members, said pilot being engaged by the work and moved thereby along the slot, the movement of the pilot being stopped when the pilot portion engages a member, a magazine for said members, and means for feeding the members from the magazine to locations at predetermined distances apart along the slot.

8. The combination with a machine of a work table on which the work is supported as it moves away from the machine, said table having a longitudinally extending slot in the top thereof, and means for stopping the movement of the work on the table at predetermined points, said means including members spaced longitudinally along the slot, a pilot fixed to reciprocate in said slot and having a portion adapted to engage said members, said pilot being engaged by the work and moved thereby along the slot, the movement of the pilot being stopped when the pilot portion engages a member, a shaft on which said members are supported along the slot, a magazine in which the members are stored, and means for feeding said members from the magazine to locations along said shaft.

9. The combination with a machine of a work table on which the work is supported as it moves away from the machine, said table having a longitudinally extending slot in the top thereof, and means for stopping the movement of the work on the table at predetermined points, said means including members spaced longitudinally along the slot, a pilot fixed to reciprocate in said slot and having a portion adapted to engage said members, said pilot being engaged by the work and moved thereby along the slot, the movement of the pilot being stopped when the pilot portion engages a member, a shaft on which said members are supported along the slot, a pivotally mounted magazine in which the members are stored, means for tilting the magazine to feed said members seriatim to the shaft, and means for rotating the shaft to advance the members along the slot to locations at predetermined distances apart.

10. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, and means for feeding said members to said table and positioning them in predetermined spaced relation longitudinally therealong.

11. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a magazine for said members and means for feeding the members from the magazine to the said table and positioning them in predetermined spaced relation longitudinally therealong.

12. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a magazine for said members and means for feeding the members from the magazine to the said table and positioning them in predetermined spaced relation longitudinally therealong and for returning the members to the magazine.

13. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members and movable toward and from the shaft, means for rotating the shaft and means for moving said magazine at predetermined intervals, the leading member in the magazine being removed therefrom by the shaft when the magazine reaches its position near the shaft.

14. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members and movable toward and from the shaft, means for rotating the shaft and means for moving said magazine at predetermined intervals, the leading member in the magazine being removed therefrom by the shaft when the magazine reaches its position near the shaft and means for preventing the removal of other than the leading member.

15. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members and movable toward and from the shaft, means for rotating the shaft and means for moving said magazine at predetermined intervals, the leading member in the magazine being removed therefrom by the shaft when the magazine reaches its position near the shaft, means for advancing the members in the magazine and means for preventing the removal of other than the leading member.

16. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging positions, a magazine for said members, means for feeding the members from the magazine seriatim to the shaft and means for rotating said shaft to advance the members therealong, the members being fed at intervals whereby they are spaced predetermined distances apart along the shaft.

17. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members above one end of the shaft and parallel thereto, and means for feeding the members from the magazine seriatim to the shaft, and means for rotating said shaft to advance the members therealong, the members being fed at intervals whereby they are spaced predetermined distances apart along the shaft.

18. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members above one end of the shaft and parallel thereto, means for advancing the members in the magazine, means for rotating the shaft and means for lowering the magazine so that the leading member therein is engaged and removed from the magazine by said shaft.

19. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members above one end of the shaft, said magazine being pivotally supported at one end and normally held parallel to the shaft, means for advancing the members in the magazine, means for rotating the shaft and means for lowering the free end of the magazine so that the leading member therein is engaged and removed from the magazine by the shaft.

20. The combination with a machine of a work table on which the work is supported as it moves away from the machine, means for stopping the movement of the work on the table at predetermined points, said means including members spaced longitudinally along said table and a pilot engaged by the work and moved thereby along the table and having a portion adapted to engage said members, a shaft on which said members are supported in pilot engaging position, a magazine for the members above one end of the shaft, said magazine being pivotally supported at one end and normally held parallel to the shaft, means for advancing the members in the magazine, means for rotating the shaft, means for lowering the free end of the magazine so that the leading member therein is engaged and removed from the magazine by the shaft and means for preventing the removal of other members from the magazine by the shaft.

WILLIAM J. TAYLOR.
JOSEPH A. BOUDREAU.
FRANK L. IRISH.